(12) United States Patent
Chen et al.

(10) Patent No.: US 9,591,229 B2
(45) Date of Patent: Mar. 7, 2017

(54) IMAGE TRACKING CONTROL METHOD, CONTROL DEVICE, AND CONTROL EQUIPMENT

(71) Applicant: ZTE CORPORATION, Shenzhen, Guangdong Province (CN)

(72) Inventors: Jun Chen, Shenzhen (CN); Qiang Huang, Shenzhen (CN); Zhihong Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/426,480

(22) PCT Filed: Sep. 29, 2013

(86) PCT No.: PCT/CN2013/084558
§ 371 (c)(1),
(2) Date: Mar. 6, 2015

(87) PCT Pub. No.: WO2015/042897
PCT Pub. Date: Apr. 2, 2015

(65) Prior Publication Data
US 2016/0286133 A1    Sep. 29, 2016

(51) Int. Cl.
*H04N 5/232* (2006.01)
*H04N 7/14* (2006.01)
*G06F 3/16* (2006.01)
*H04R 1/32* (2006.01)

(52) U.S. Cl.
CPC ........... *H04N 5/23296* (2013.01); *G06F 3/16* (2013.01); *H04N 7/142* (2013.01); *H04R 1/326* (2013.01); *H04N 5/232* (2013.01)

(58) Field of Classification Search
CPC ................. H04N 7/142; H04N 7/15
See application file for complete search history.

(56) References Cited

U.S. PATENT DOCUMENTS 5,778,082 A * 7/1998 Chu .......................... H04N 7/15
348/14.07
6,618,073 B1 * 9/2003 Lambert ................ H04N 7/142
348/14.05

(Continued)

FOREIGN PATENT DOCUMENTS

| CN | 101567969 A | 10/2009 |
|---|---|---|
| CN | 102300043 A | 12/2011 |

(Continued)

*Primary Examiner* — Amy Hsu
(74) *Attorney, Agent, or Firm* — Ling Wu; Stephen Yang; Ling and Yang Intellectual Property

(57) ABSTRACT

A control method, control apparatus, and control device are disclosed. The control method includes: acquiring audio data including voice information of a target voice source; determining location range information of the target voice source according to the audio data; and controlling rotation of a camera device which currently cannot capture the target voice source according to the location range information, so that the camera device can capture the target voice source. The embodiments of the present invention support capture of a target voice source outside an original screen range by the camera device.

5 Claims, 4 Drawing Sheets

(56) References Cited

U.S. PATENT DOCUMENTS

| | | | | |
|---|---|---|---|---|
| 2004/0012669 A1* | 1/2004 | Drell | ............... | H04N 7/148 348/14.08 |
| 2008/0174665 A1* | 7/2008 | Enstad | ............... | H04N 7/142 348/211.12 |
| 2010/0118112 A1* | 5/2010 | Nimri | ............... | H04N 7/147 348/14.08 |
| 2011/0285808 A1* | 11/2011 | Feng | ............... | H04N 7/142 348/14.09 |
| 2014/0049595 A1* | 2/2014 | Feng | ............... | H04N 7/15 348/14.08 |
| 2014/0241549 A1* | 8/2014 | Stachurski | ............... | H04M 3/568 381/92 |

FOREIGN PATENT DOCUMENTS

| | | |
|---|---|---|
| CN | 103685906 A | 3/2014 |
| EP | 2388996 A2 | 11/2011 |
| WO | 0211438 A1 | 2/2002 |

\* cited by examiner

IMAGE TRACKING CONTROL METHOD, CONTROL DEVICE, AND CONTROL EQUIPMENT

TECHNICAL FIELD

The embodiments of the present invention relate to the field of image tracking, and in particular, to a control method, control apparatus and control device.

BACKGROUND OF THE RELATED ART

In the process of video communication, a video camera needs to align with a speaker. In the existing schemes, the image identification technology is used for face recognition, and then a video camera is controlled remotely to align with a position of the face. However, such scheme cannot achieve tracking a speaker outside a screen range or another speaker in the screen range.

SUMMARY

In view of this, the purpose of the embodiments of the present invention is to provide a control method, control apparatus, and control device, to support capture of a target sound source outside an original screen range by the camera device.

In order to solve the above technical problem, the embodiments of the present invention provide the following schemes.

The embodiments of the present invention provide a control method, comprising:

acquiring audio data including sound information of a target sound source;

determining location range information of the target sound source according to the audio data; and controlling, according to the location range information, rotation of a camera device which currently cannot capture the target sound source, so that the camera device can capture the target sound source.

Preferably, the location range information is direction information of the target sound source with respect to the camera device, and controlling, according to the location range information, rotation of the camera device which currently cannot capture the target sound source is:

determining a rotation control parameter of the camera device corresponding to the direction information; and controlling the rotation of the camera device according to the rotation control parameter.

Preferably, the audio data is collected by a sound collection device, and determining the location range information of the target sound source according to the audio data is:

determining position information of the target sound source with respect to the sound collection device according to the audio data; and determining the direction information according to the position information.

Preferably, determining the direction information according to the position information is:

determining the direction information according to the position information and a preset corresponding relationship between the position information and the direction information.

Preferably, the sound collection device is used to determine a preset plane of the position information and a preset reference point on the preset plane, the camera device corresponds to a first corresponding point on the preset plane, and the target sound source corresponds to a second corresponding point on the preset plane, the position information is a location coordinate of the second corresponding point with respect to the preset reference point, and the direction information is a coordinate representing direction information of the second corresponding point with respect to the first corresponding point, the corresponding relationship is a plane geometric function with a location coordinate of a phonation corresponding point on the preset plane with respect to the preset reference point as an argument, a location coordinate of the first corresponding point with respect to the preset reference point as a parameter, and a coordinate representing direction information of the phonation corresponding point with respect to the first corresponding point as a variable.

Preferably, the location coordinate of the first corresponding point with respect to the preset reference point is a coordinate (a1, a2) in a rectangular coordinate with the preset reference point as a first origin, which belongs to the preset plane, the location coordinate of the phonation corresponding point with respect to the preset reference point is a coordinate (x, y) in the rectangular coordinate, where y is larger than a2, and the coordinate representing the direction information is an angular coordinate b in a polar coordinate with the first corresponding point as a second origin, which belongs to the preset plane, when a2 is 0, a polar axis of the polar coordinate is in the same direction as an x axis of the rectangular coordinate; and when a2 is not 0, the polar axis of the polar coordinate is parallel to the x axis of the rectangular coordinate and is in the same direction as the x axis, the plane geometric function is $b=\arctan((y-a2)/(x-a1))$, wherein x is not equal to a1; or the plane geometric function is: $b=\arctan((y-a2)/(x-a1))$ when x is not equal to a1, and b=90 degree when x is equal to a1.

Preferably, the parameter is determined according to a location coordinate of a corresponding training point of at least one training sound source obtained by study training on the preset plane with respect to the preset reference point and a coordinate representing direction information of the training point with respect to the first corresponding point.

The embodiments of the present invention provide a control apparatus, comprising:

an acquisition module, configured to acquire audio data including sound information of a target sound source;

a determination module, configured to determine location range information of the target sound source according to the audio data;

a control module, configured to control, according to the location range information, rotation of a camera device which currently cannot capture the target sound source, so that the camera device can capture the target sound source.

Preferably, the location range information is direction information of the target sound source with respect to the camera device, and the control module comprises:

a first determination unit, configured to determine a rotation control parameter of the camera device corresponding to the direction information; and a control unit, configured to control the rotation of the camera device according to the rotation control parameter, so that the camera device can capture the target sound source.

Preferably, the audio data is collected by a sound collection device, and the determination module comprises:

a second determination unit, configured to determine position information of the target sound source with respect to the sound collection device according to the audio data; and a third determination unit, configured to determine the direction information according to the position information.

Preferably, the third determination unit comprises:

a determination sub-unit, configured to determine the direction information according to the position information and a preset corresponding relationship between the position information and the direction information.

The embodiments of the present invention provide a control device, comprising the above control apparatus.

It can be seen from the above contents that the control method, control apparatus and control device according to the embodiments of the present invention at least include the following technical effects.

Audio data including sound information of a target sound source is acquired; location range information of the target sound source is determined according to the audio data; and rotation of a camera device which currently cannot capture the target sound source is controlled according to the location range information, so that the camera device can capture the target sound source, to support capture of a target sound source outside an original screen range by the camera device.

PREFERRED EMBODIMENTS OF THE PRESENT INVENTION

The embodiments of the present invention will be described in detail below in conjunction with accompanying drawings and specific embodiments.

Figure 1:
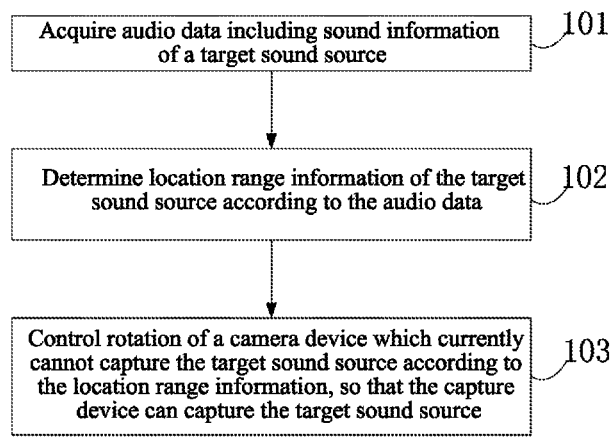
FIG. 1 is a flowchart of a control method according to an embodiment of the present invention.

FIG. 1 is a flowchart of a control method according to an embodiment of the present invention. With reference to FIG. 1, the embodiments of the present invention provide a control method, comprising the following steps.

In step 101, audio data including sound information of a target sound source is acquired;

in step 102, location range information of the target sound source is determined according to the audio data; and in step 103, rotation of a camera device which currently cannot capture the target sound source is controlled according to the location range information, so that the camera device can capture the target sound source.

Thus, audio data including sound information of a target sound source is acquired; location range information of the target sound source is determined according to the audio data; and rotation of a camera device which currently cannot capture the target sound source is controlled according to the location range information, so that the camera device can capture the target sound source, to support capture of a target sound source outside an original screen range by the camera device.

Obviously, the target sound source should be located in a complete capture range in which the camera device can arrive by rotation.

The target sound source may be a person who speaks, or may also be a sounding device.

The camera device may be a photo camera or a video camera.

Specifically, for example, the sound information may include preset keyword content representing the location range information. Then, the location range information may be determined according to the audio data using the voice identification technology.

Alternatively, for example, the location range information may be direction information of the target sound source with respect to the camera device, and controlling rotation of a camera device which currently cannot capture the target sound source according to the location range information may specifically be:

determining a rotation control parameter of the camera device corresponding to the direction information; and controlling the rotation of the camera device according to the rotation control parameter.

Wherein, the rotation control parameter may be an identify of a certain angle of a number of adjustable angles for the camera device, a rotation angle of a head controller of a video camera, a direction parameter of an optical axis of the video camera, etc.

Specifically, the audio data may be collected by a sound collection device, and determining location range information of the target sound source according to the audio data may specifically be:

determining position information of the target sound source with respect to the sound collection device according to the audio data; and determining the direction information according to the position information.

Wherein, the sound collection device is for example an array of microphones.

The position information may be direction or position information.

Further, determining the direction information according to the position information may specifically be:

determining the direction information according to the position information and a preset corresponding relationship between the position information and the direction information.

Specifically, for example, sufficient combinations of position information and direction information are obtained by training of sufficient multiple points, and these combinations are fitted to obtain the corresponding relationship. For example, training sound sources are placed or moved with a distribution granularity of 0.1 m.

As another example, the camera device and the sound collection device are placed according to a particular position relationship, so that directions represented by the position information and the direction information are consistent while the target sounding source is located in an any position; and the corresponding relationship is determined based on the particular position relationship. For example, the camera device may be placed together with the sound collection device, or when the sound collection device is placed horizontally, the camera device is placed above the sound collection device. In the following preferable embodiment one, the manner of placing together is used.

It should be illustrated that in consideration of the limit of the position where the camera device is placed in practice, a deviation in the position where the camera device is placed may be allowed. As the camera device can capture a wider range at the same time, the deviation is possible as long as the camera device can capture the direction represented by the position information. This may be achieved on site in the engineering practice, which will not be further described here.

As another example, the sound collection device is used to determine a preset plane of the position information and a preset reference point on the preset plane, the camera device corresponds to a first corresponding point on the preset plane, and the target sound source corresponds to a second corresponding point on the preset plane, the position information is a location coordinate of the second corresponding point with respect to the preset reference point, and the direction information is a coordinate representing direction information of the second corresponding point with respect to the first corresponding point, the corresponding relationship is a plane geometric function with a location coordinate of a phonation corresponding point on the preset plane with respect to the preset reference point as an argument, a location coordinate of the first corresponding point with respect to the preset reference point as a parameter, and a value representing direction information of the phonation corresponding point with respect to the first corresponding point as a variable.

Wherein, the first corresponding point is for example, an optical center of the camera device or a projection of the optical center of the camera device on the preset plane.

The second corresponding point is for example a certain point of the target sound source on the preset plane, or a projection of a certain point of the target sound source which is not on the preset plane on the preset plane.

The corresponding sounding sound is for example a reference sounding point of the sound source on the preset plane or a projection of a reference sounding point of the sound source which is not on the preset plane on the preset plane. Wherein, the reference sounding point may be a certain point of the throat of a person or a certain point of a sound output unit of a sound source.

The value representing direction information is for example when the second corresponding point is used as an origin and there is an axial coordinate system on the preset plane with the origin as a center, an angle coordinate value of the corresponding sound point in the axial coordinate system.

The preset plane and the preset reference point corresponding to the sound collection device are related to which the sound collection device is. For example, a planar array of microphones uses a positioning plane and a positioning reference point.

It should be illustrated that in practical applications, the position of the sound source may be within the preset plane, or may be on a certain side of the preset plane. In addition, due to influences of other factors, the obtained position information may have a small error. However, as the camera device can capture a wide range at the same time, such error will not influence the solution of the technical problem to be solved by the embodiments of the present invention.

Specific examples of the plane geometric function herein are given as follows: the location coordinate of the first corresponding point with respect to the preset reference point is a coordinate (a1, a2) in a rectangular coordinate with the preset reference point as a first origin, which belongs to the preset plane, the location coordinate of the phonation corresponding point with respect to the preset reference point is a coordinate (x, y) in the rectangular coordinate, where y is larger than a2, and the coordinate representing the direction information is an angular coordinate b in a polar coordinate with the first corresponding point as a second origin, which belongs to the preset plane, when a2 is 0, a polar axis of the polar coordinate is in the same direction as an x axis of the rectangular coordinate; and when a2 is not 0, the polar axis of the polar coordinate is parallel to the x axis of the rectangular coordinate and is in the same direction as the x axis, the plane geometric function is $b=\arctan((y-a2)/(x-a1))$, wherein x is not equal to a1; or the plane geometric function is: $b=\arctan((y-a2)/(x-a1))$ when x is not equal to a1, and $b=90$ degree when x is equal to a1.

The parameter may be measured and calculated on site in the process of engineering implementation; or the parameter may be determined according to a location coordinate of a corresponding training point of at least one training sound source obtained by study training on the preset plane with respect to the preset reference point and a value representing direction information of the training point with respect to the first corresponding point.

The study training manner is for example as follows:

determining a first location coordinate of a first training point on the preset plane corresponding to a first sound source with respect to the preset reference point and a value representing first direction information of the first training point with respect to the first corresponding point;

obtaining the parameter according to the first location coordinate and the value representing the first direction information;

wherein, the first training point, the first corresponding point, and the preset reference point are non-collinear.

Such study training manner is used in the following preferable embodiment two.

Alternatively, the study training manner is for example as follows:

determining a second location coordinate of a second training point on the preset plane corresponding to a second sound source with respect to the preset reference point and a value representing second direction information of the second training point with respect to the first corresponding point;

determining a third location coordinate of a third training point on the preset plane corresponding to a third sound source with respect to the preset reference point and a value representing third direction information of the third training point with respect to the first corresponding point;

obtaining the parameter according to the second location coordinate, the value representing the second direction information, the third location coordinate, and the value representing the third direction information;

wherein, the second training point, the third training point and the first corresponding point are non-collinear.

Such study training manner is used in the following preferable embodiment three.

In order to further illustrate the above control method, three preferable embodiments of the control method are given below.

Figure 2:
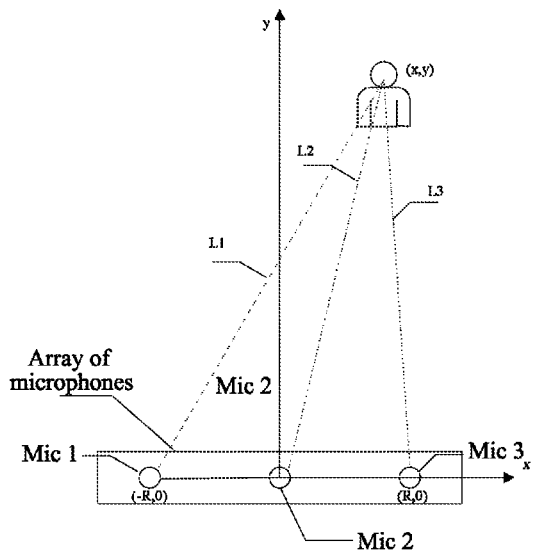
FIG. 2 is a diagram of location coordinates of an array of microphones and a sound source in preferable embodiment one of a control method according to an embodiment of the present invention.

Preferable embodiment one:

FIG. 2 is a diagram of location coordinates of an array of microphones and a sound source in preferable embodiment one of a control method according to an embodiment of the present invention. With reference to FIG. 2, there are many physical forms of the array of microphones. A linear array of microphones is used in the present preferable embodiment, in which at least three mics are included. At the same time, the video camera is placed together with the array of microphones. The steps of the present preferable embodiment are as follows:

In step 201, audio data is received respectively using multiple mics of the array of microphones, and after a background noise is filtered, the audio data is transmitted to a processing center, or after the audio data is transmitted to the processing center, the noise is filtered.

In step 202, the processing center extracts vocal parts from the multi-path audio data according to frequencies, and then calculates time differences among the vocals received by the multiple mics according to phase differences among the vocal parts in the multi-path audio data.

In step 203, distance differences may be calculated by multiplying the time differences received by the multiple mics with a sound velocity, and then the position of the sound may be calculated according to the distance differences among the three mics.

Specifically, direct distances among the mics of the array of microphones are known, which are set as R. If mic 2 is denoted as a coordinate origin, a coordinate of the mic 1 is $(-R,0)$, and a coordinate of mic 3 is $(R,0)$. Then, the coordinate of the sound source to be calculated is $(x,y)$;

The distances between the sound source and the mic 1, the mic 2 and the mic 3 are respectively denoted as L1, L2 and L3. In practice, the values obtained by multiplying the time differences measured in the last step with the sound velocity are difference values among L1, L2, and L3, that is, L1-L3 and L2-L3 are known values, which are denoted as D13 and D23 respectively;

According to the Pythagorean theorem, the following equations are obtained:

$$L1 = \sqrt{(x+R)^2 + y^2} = \sqrt{x^2 + y^2 + R^2 + 2xR}$$

$$L2 = \sqrt{x^2 + y^2}$$

$$L3 = \sqrt{(x-R)^2 + y^2} = \sqrt{x^2 + y^2 + R^2 - 2xR}$$

then, $$L3 = L1 - L3 = \sqrt{x^2 + y^2 + R^2 + 2xR} - \sqrt{x^2 + y^2 + R^2 - 2xR}$$

$$= \sqrt{\left(\sqrt{x^2 + y^2 + R^2 + 2xR} - \sqrt{x^2 + y^2 + R^2 - 2xR}\right)^2}$$

$$= \sqrt{2x^2 + 2y^2 + 2R^2 - 2\sqrt{\frac{x^4 + y^4 + R^4 + 2x^2y^2 +}{2x^2R^2 + 2y^2R^2 - 4x^2R^2}}}$$

after square is performed, the following equation is obtained:

$$D13^2 = 2x^2 + 2y^2 + 2R^2 - 2\sqrt{\frac{x^4 + y^4 + R^4 + 2x^2y^2 - 2x^2R^2 + 2y^2R^2}{\sqrt{x^4 + y^4 + R^4 + 2x^2y^2 - 2x^2R^2 + 2y^2R^2}}}$$

$$= x^2 + 2y^2 + R^2 - 0.5*D13^2$$

after square is performed, the following equation is obtained:

$$x^4 + y^4 + R^4 + 2x^2y^2 - 2x^2R^2 + 2y^2R^2 = x^4 + y^4 + (R^2 - 0.5*D13^2)^2 + 2x^2y^2 + 2x^2(R^2 - 0.5*D13^2) + 2y^2(R^2 - 0.5*D13^2)$$

after expansion is performed, the following equation is obtained:

$$x^4 + y^4 + R^4 + 2x^2y^2 - 2x^2R^2 + 2y^2R^2 = x^4 + y^4 + R^4 - R^2D13^2 + 0.25D13^4 + 2x^2y^2 + 2x^2R^2 - x^2D13^2 + 2y^2R^2 - y^2D13^2$$

after simplification is performed on the left and right of the equation, the following equation is obtained:

$$y^2D13^2 = -R^2D13^2 + 0.25D13^4 + 4x^2R^2 - x^2D13^2$$

finally, the following equation is obtained:

$$y = \pm\sqrt{\left(\frac{4R^2}{D13^2} - 1\right)x^2 + 0.25*D13^2 - R^2}$$

In a practical application scenario of the present preferable embodiment, the sound source is always from the front, and at this time, the negative sign may be omitted, and the equation becomes as follows:

$$y = \sqrt{\left(\frac{4R^2}{D13^2} - 1\right)x^2 + 0.25*D13^2 - R^2} \qquad \text{Equation A}$$

At the same time, the following equation should further be satisfied:

$$D23 = L2 - L3 = \sqrt{x^2 + y^2} - \sqrt{x^2 + y^2 + R^2 - 2xR}$$

that is, $$D23 = \sqrt{x^2 \pm y^2} - \sqrt{x^2 + y^2 + R^2 - 2xR} \qquad \text{Equation B}$$

x and y which satisfy the equations A and B at the same time may be easily obtained using a software program. Specifically, the sign of x is according to the sign of D13, then y is obtained by circularly using the equation A with x as a cyclic variable, and then x and y are substituted into the equation B, until equation B is true, and at this time, the obtained x and y are the position of the sound source. An angle of the sound source is $$\tan^{-1}\frac{y}{x}.$$

In step 204, according to the sound position obtained in the last step, the video camera is controlled to rotate to align with the direction.

In step 205, in the image captured by the video camera, a position of a face is found using a face recognition technology, which is described as follows.

In a first step, collected image data is input;

in a second step, binaryzation is performed on the image through a skin color model, i.e., a non-skin color part is set as 0, and a skin color part is set as 1, wherein, a value range of the skin color may be obtained by statistic learning in a practical device;

in a third step, a corrosion and expansion algorithm is called for filtering;

in a fourth step, connected area detection is used to judge the position of the face with a width of the connected area conforming to a size of the face and a height of the connected area being larger than or equal to the size of the face as a standard.

In step 206, the video camera is rotated towards the face direction until it aligns with the face.

Figure 3:
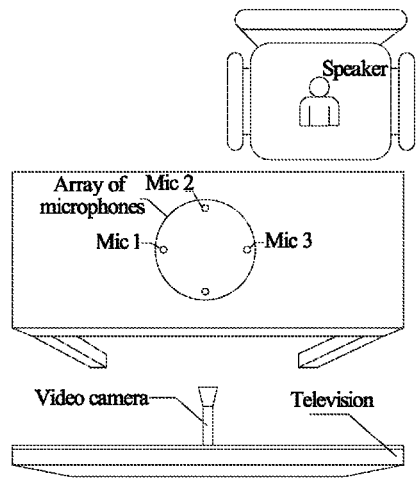
FIG. 3 is a diagram of positions when an array of microphones is arranged in front of a video camera in preferable embodiment two of a control method according to an embodiment of the present invention.

Preferable embodiment two:

FIG. 3 is a diagram of positions when an array of microphones is arranged in front of a video camera in preferable embodiment two of a control method according to an embodiment of the present invention. With reference to FIG. 3, there are many physical forms of the array of microphones. A circular array of microphones is used in the present preferable embodiment, in which at least three mics are included. At the same time, the video camera is not placed together with the array of microphones, and instead, the array of microphones is placed in front of the video camera. The steps of the present preferable embodiment are as follows:

In step 301, audio data is received respectively using multiple mics of the array of microphones, and after a background noise is filtered, the audio data is transmitted to a processing center, or after the audio data is transmitted to the processing center, the noise is filtered.

In step 302, the processing center extracts vocal parts from the multi-path audio data according to frequencies, and then calculates time differences among the vocals received by the multiple mics according to phase differences among the vocal parts in the multi-path audio data.

In step 303, distance differences may be calculated by multiplying the time differences received by the multiple mics with a sound velocity, and then the position of the sound may be calculated according to the distance differences among the three mics.

Figure 4:
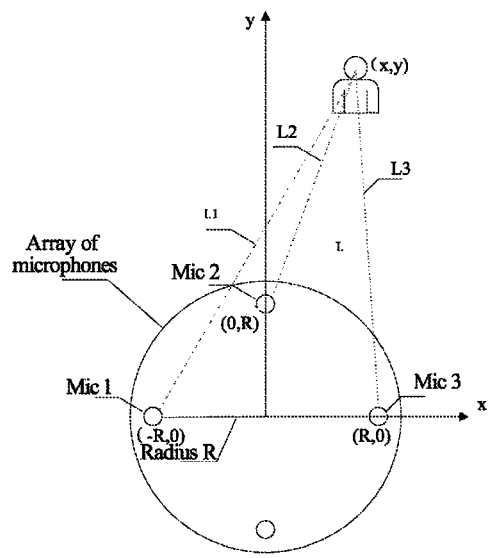
FIG. 4 is a diagram of location coordinates of an array of microphones and a sound source in preferable embodiment two of a control method according to an embodiment of the present invention.

Specifically, FIG. 4 is a diagram of location coordinates of an array of microphones and a sound source in preferable embodiment two of a control method according to an embodiment of the present invention. With reference to FIG. 4, direct distances among the mics of the array of microphones are known, which are set as R. If the center of the array of the microphones is denoted as a coordinate origin, a coordinate of the mic 1 is (−R,0), a coordinate of the mic 2 is (0,R) and a coordinate of mic 3 is (R,0). Then, the coordinate of the sound source to be calculated is (x,y);

The distances between the sound source and the mic 1, the mic 2 and the mic 3 are respectively denoted as L1, L2 and L3. In practice, the values obtained by multiplying the time differences in the last step with the sound velocity are difference values among L1, L2, and L3, that is, L1-L3 and L2-L3 are known values, which are denoted as D13 and D23 respectively; According to the Pythagorean theorem, the following equations are obtained:

$$L1=\sqrt{(x+R)^2+y^2}=\sqrt{x^2+y^2+R^2+2xR}$$

$$L2=\sqrt{x^2+(y+R)^2}=\sqrt{x^2+y^2+R^2+2yR}$$

$$L3=\sqrt{(x-R)^2+y^2}=\sqrt{x^2+y^2+R^2-2xR}$$

then $$D13=L1-L3=\sqrt{x^2+y^2+R^2+2xR}-\sqrt{x^2+y^2+R^2-2xR}$$

the equation A may be deduced according to D13, which is the same as the preferable embodiment one:

$$y=\sqrt{\left(\frac{4R^2}{D13^2}-1\right)x^2+0.25*D13^2-R^2} \qquad \text{Equation A}$$

at the same time, the following equation should further be satisfied:

$$D23=L2-L3=\sqrt{x^2+y^2+R^2-2yR}-\sqrt{x^2+y^2+R^2-2xR}$$

that is, $$D23=\sqrt{x^2+y^2+R^2-2yR}-\sqrt{x^2+y^2+R^2-2xR} \qquad \text{Equation C}$$

x and y which satisfy the equations A and C at the same time may be easily obtained using a software program. Specifically, the sign of x is according to the sign of D13, then y is obtained by circularly using the equation A with x as a cyclic variable, and then x and y are substituted into the equation C, until equation C is true, and at this time, the obtained x and y are the position of the sound source.

In step 304, the angle of the video camera is aligned with the direction represented by the angle arctan((d+y)/x).

Figure 5:
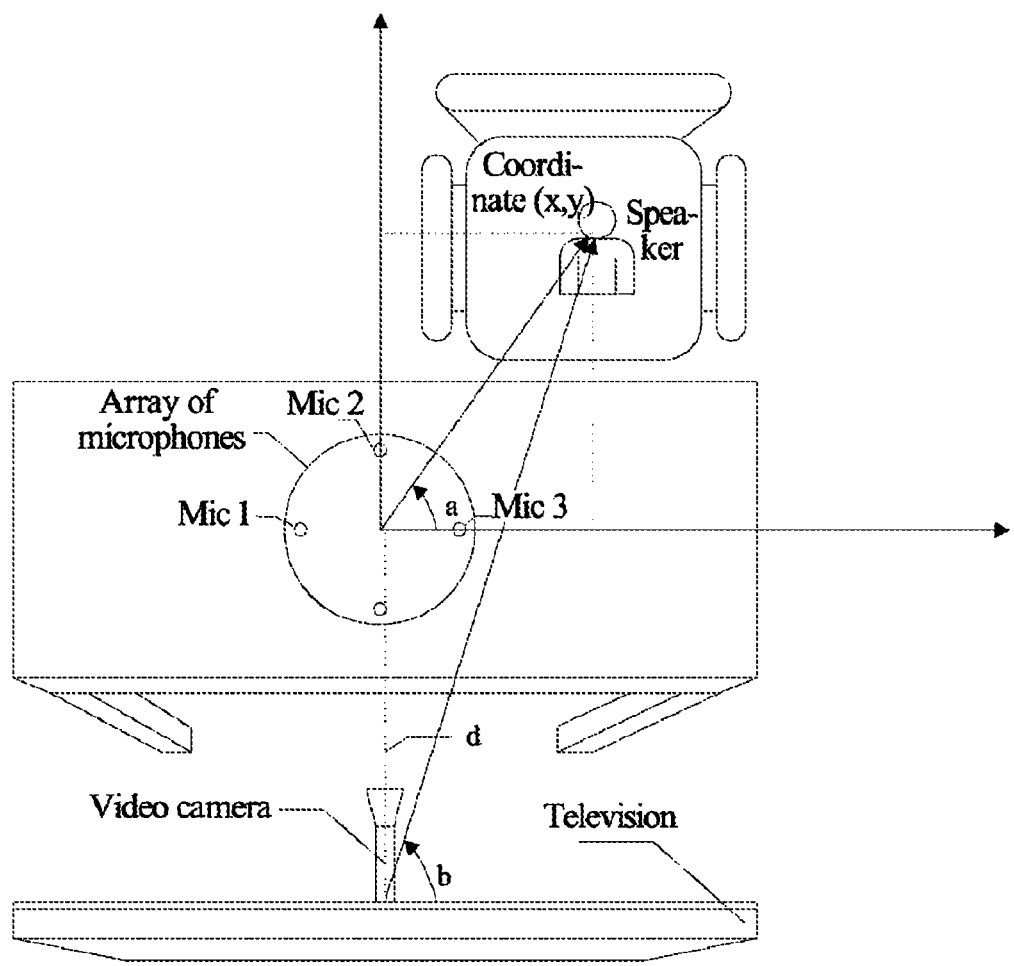
FIG. 5 is a diagram of training in preferable embodiment two of a control method according to an embodiment of the present invention.

Wherein, in a practical usage scenario, as the positions of the digital microphone and the video camera in a conference hall are fixed and will not move, d may be obtained by means of study training. Specifically, FIG. 5 is a diagram of training in preferable embodiment two of a control method according to an embodiment of the present invention. With reference to FIG. 5, during training, a speaker does not stand in front of the video camera. That is, a cannot be 90 degree in FIG. 5. Then the video camera is rotated to align with the speaker, and an angle b is measured by the video camera. After talk ends from the speaker, coordinates values of x and y are obtained using the above steps, and the distance d between the video camera and the array of microphones can be calculated using an equation d=x/tan(b)−y.

In step 305, in the image captured by the video camera, a position of a face is found using a face recognition technology, which is described as follows.

In a first step, collected YUV data is input;

in a second step, binaryzation is performed on the image through a skin color model, i.e., a non-skin color part is set as 0, and a skin color part is set as 1, wherein, a value range of the skin color may be obtained by statistic learning in a practical device;

in a third step, a corrosion and expansion algorithm is called for filtering;

in a fourth step, connected area detection is used to judge the position of the face with a width of the connected area conforming to a size of the face and a height of the connected area being larger than or equal to the size of the face as a standard.

In step 306, the video camera is rotated towards the face direction until it aligns with the face.

Figure 6:
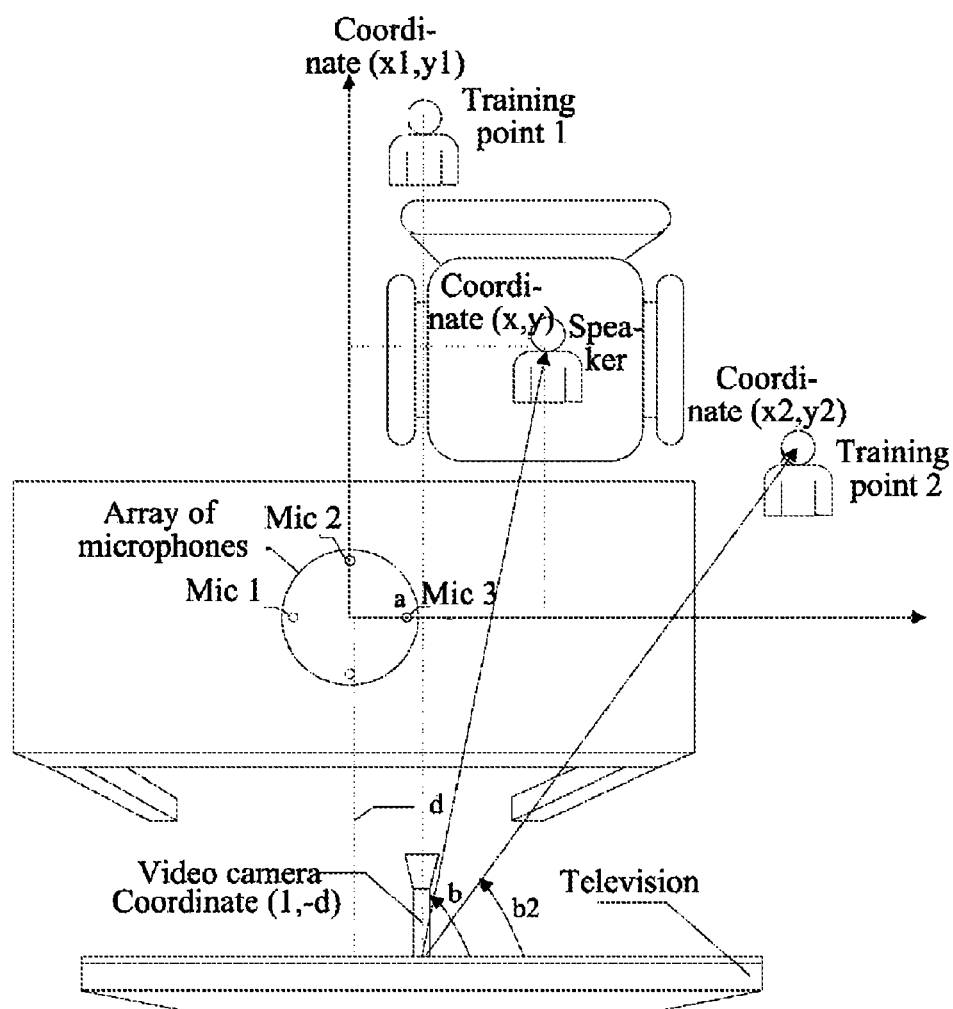
FIG. 6 is a diagram of preferable embodiment three of a control method according to an embodiment of the present invention.

Preferable embodiment three:

FIG. 6 is a diagram of preferable embodiment three of a control method according to an embodiment of the present invention. With reference to FIG. 6, there are many physical forms of the array of microphones. A circular array of microphones is used in the present preferable embodiment, in which at least three mics are included. The video camera is not placed together with the array of microphones, and instead, the array of microphones is placed in front of the video camera and is moved in a horizontal direction. The coordinate of the position of the sound source is (x, y), and the coordinate of the video camera with respect to the array of microphones is (l,−d). The steps of the present preferable embodiment are as follows:

in step 401, x and y are obtained using the similar manner as steps 301-303 in the preferable embodiment two.

In step 402, the angle of the video camera is aligned with the direction represented by the angle b, wherein b=arctan ((y+d)/(x−l)).

Wherein, in a practical usage scenario, as the positions of the digital microphone and the video camera in a conference hall are fixed and will not move, d and l may be obtained by means of study training. Specifically, first of all, a trainer talks in front of the video camera, and coordinate (x1,y1) is calculated by the array of microphones, and then the abscissa of the video camera is l=x1; then the trainer talks in a position which is not in front of the video camera, the video camera is controlled by an operator to align with the trainer, and at this time, the angle is calculated statistically by the video camera per se as b2; and the coordinate (x2,y2) is calculated by the array of microphones, and then tan(b2)= (y2+d)/(x2−1). As l=x1, tan(b2)=(y2+d)/(x2−x1). Thus, d=tan(b2)*(x2−x1)−y2 may be calculated.

In step 403, in the image captured by the video camera, a position of a face is found using a face recognition technology, which is described as follows.

In a first step, collected YUV data is input;

in a second step, binaryzation is performed on the image through a skin color model, i.e., a non-skin color part is set as 0, and a skin color part is set as 1, wherein, a value range of the skin color may be obtained by statistic learning in a practical device;

in a third step, a corrosion and expansion algorithm is called for filtering;

in a fourth step, connected area detection is used to judge the position of the face with a width of the connected area conforming to a size of the face and a height of the connected area being larger than or equal to the size of the face as a standard.

In step 404, the video camera is rotated towards the face direction until it aligns with the face.

The embodiments of the present invention further provide a control apparatus, comprising:

an acquisition module, used to acquire audio data including sound information of a target sound source;

a determination module, used to determine location range information of the target sound source according to the audio data;

a control module, used to control rotation of a camera device which currently cannot capture the target sound source according to the location range information, so that the camera device can capture the target sound source.

Thus, audio data including sound information of a target sound source is acquired; location range information of the target sound source is determined according to the audio data; and rotation of a camera device which currently cannot capture the target sound source is controlled according to the location range information, so that the camera device can capture the target sound source, to support capture of a target sound source outside an original screen range by the camera device.

Further, the location range information is direction information of the target sound source with respect to the camera device, and the control module comprises:

a first determination unit, used to determine a rotation control parameter of the camera device corresponding to the direction information; and a control unit, used to control the rotation of the camera device according to the rotation control parameter so that the camera device can capture the target sound source.

Further, the audio data is collected by a sound collection device, and the determination module comprises:

a second determination unit, used to determine position information of the target sound source with respect to the sound collection device according to the audio data; and a third determination unit, used to determine the direction information according to the position information.

Further, the third determination unit comprises:

a determination sub-unit, used to determine the direction information according to the position information and a preset corresponding relationship between the position information and the direction information.

The embodiments of the present invention further provide a control device, comprising the above control apparatus.

The above description is merely implementations of the embodiments of the present invention. It should be pointed out that a number of improvements and modifications may be made by an ordinary skilled in the art without departing from the principle of the embodiments of the present invention. These improvements and modifications should be construed as belonging to the protection scope of the embodiments of the present invention.

INDUSTRIAL APPLICABILITY

The above scheme supports capture of a target sound source outside an original screen range by the camera device.

What is claimed is:

1. A control method, comprising:
acquiring audio data including sound information of a target sound source;
determining location range information of the target sound source according to the audio data; and
controlling, according to the location range information, rotation of a camera device which currently cannot capture the target sound source, so that the camera device can capture the target sound source;
wherein, the location range information is direction information of the target sound source with respect to the camera device, and
controlling, according to the location range information, rotation of the camera device which currently cannot capture the target sound source is:
determining a rotation control parameter of the camera device corresponding to the direction information; and
controlling the rotation of the camera device according to the rotation control parameter;
wherein, the audio data is collected by a sound collection device, and determining the location range information of the target sound source according to the audio data is:
determining position information of the target sound source with respect to the sound collection device according to the audio data; and
determining the direction information according to the position information;
wherein, determining the direction information according to the position information is:
determining the direction information according to the position information and a preset corresponding relationship between the position information and the direction information;

wherein, the sound collection device is used to determine a preset plane of the position information and a preset reference point on the preset plane, the camera device corresponds to a first corresponding point on the preset plane, and the target sound source corresponds to a second corresponding point on the preset plane, the position information is a location coordinate of the second corresponding point with respect to the preset reference point, and the direction information is a coordinate representing direction information of the second corresponding point with respect to the first corresponding point, the corresponding relationship is a plane geometric function with a location coordinate of a phonation corresponding point on the preset plane with respect to the preset reference point as an argument, a location coordinate of the first corresponding point with respect to the preset reference point as a parameter, and a coordinate representing direction information of the phonation corresponding point with respect to the first corresponding point as a variable.

2. The control method according to claim 1, wherein, the location coordinate of the first corresponding point with respect to the preset reference point is a coordinate (a1, a2) in a rectangular coordinate with the preset reference point as a first origin, which belongs to the preset plane, the location coordinate of the phonation corresponding point with respect to the preset reference point is a coordinate (x, y) in the rectangular coordinate, where y is larger than a2, and the coordinate representing the direction information is an angular coordinate b in a polar coordinate with the first corresponding point as a second origin, which belongs to the preset plane, when a2 is 0, a polar axis of the polar coordinate is in the same direction as an x axis of the rectangular coordinate; and when a2 is not 0, the polar axis of the polar coordinate is parallel to the x axis of the rectangular coordinate and is in the same direction as the x axis, the plane geometric function is $b=\arctan((y-a2)/(x-a1))$, wherein x is not equal to a1; or the plane geometric function is: $b=\arctan((y-a2)/(x-a1))$ when x is not equal to a1, and b=90 degree when x is equal to a1.

3. The control method according to claim 1, wherein, the parameter is determined according to a location coordinate of a corresponding training point of at least one training sound source obtained by study training on the preset plane with respect to the preset reference point and a coordinate representing direction information of the training point with respect to the first corresponding point.

4. A control apparatus, comprising:
an acquisition module, configured to acquire audio data including sound information of a target sound source;
a determination module, configured to determine location range information of the target sound source according to the audio data;

a control module, configured to control, according to the location range information, rotation of a camera device which currently cannot capture the target sound source, so that the camera device can capture the target sound source;

wherein, the location range information is direction information of the target sound source with respect to the camera device, and the control module comprises:

a first determination unit, configured to determine a rotation control parameter of the camera device corresponding to the direction information; and a control unit, configured to control the rotation of the camera device according to the rotation control parameter, so that the camera device can capture the target sound source;

wherein, the audio data is collected by a sound collection device, and the determination module comprises:

a second determination unit, configured to determine position information of the target sound source with respect to the sound collection device according to the audio data; and a third determination unit, configured to determine the direction information according to the position information;

a determination sub-unit, configured to determine the direction information according to the position information and a preset corresponding relationship between the position information and the direction information;

wherein, the sound collection device is used to determine a preset plane of the position information and a preset reference point on the preset plane, the camera device corresponds to a first corresponding point on the preset plane, and the target sound source corresponds to a second corresponding point on the preset plane, the position information is a location coordinate of the second corresponding point with respect to the preset reference point, and the direction information is a coordinate representing direction information of the second corresponding point with respect to the first corresponding point, the corresponding relationship is a plane geometric function with a location coordinate of a phonation corresponding point on the preset plane with respect to the preset reference point as an argument, a location coordinate of the first corresponding point with respect to the preset reference point as a parameter, and a coordinate representing direction information of the phonation corresponding point with respect to the first corresponding point as a variable.

5. A control device, comprising the control apparatus according to claim 4.

* * * * *